United States Patent
Matusek et al.

(10) Patent No.: US 9,567,954 B2
(45) Date of Patent: *Feb. 14, 2017

(54) COMPRESSIBLE BAFFLE FOR A FUEL TANK

(71) Applicant: Aeromotive, Inc., Lenexa, KS (US)

(72) Inventors: Steven M. Matusek, Olathe, KS (US); Shawn D. Wessol, Parkville, MO (US)

(73) Assignee: AEROMOTIVE, INC., Lenexa, KS (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/831,005

(22) Filed: Aug. 20, 2015

(65) Prior Publication Data

US 2015/0352945 A1    Dec. 10, 2015

Related U.S. Application Data

(60) Continuation-in-part of application No. 14/302,543, filed on Jun. 12, 2014, now Pat. No. 9,255,556, which is a division of application No. 13/795,718, filed on Mar. 12, 2013, now Pat. No. 8,783,287.

(60) Provisional application No. 61/702,649, filed on Sep. 18, 2012.

(51) Int. Cl.
*F02M 37/10* (2006.01)
*B60K 15/03* (2006.01)
*F02M 37/22* (2006.01)

(52) U.S. Cl.
CPC ............ *F02M 37/106* (2013.01); *B60K 15/03* (2013.01); *F02M 37/103* (2013.01); *B60K 2015/0344* (2013.01); *B60K 2015/03105* (2013.01); *B60K 2015/03111* (2013.01); *B60K 2015/03243* (2013.01); *B60K 2015/03453* (2013.01); *B60K 2015/03467* (2013.01); *B60Y 2304/076* (2013.01); *B60Y 2304/078* (2013.01); *F02M 2037/225* (2013.01); *F02M 2037/228* (2013.01); *Y10T 29/49826* (2015.01); *Y10T 29/53* (2015.01); *Y10T 29/53443* (2015.01); *Y10T 137/0402* (2015.04); *Y10T 137/794* (2015.04); *Y10T 137/86043* (2015.04); *Y10T 137/86228* (2015.04)

(58) Field of Classification Search
CPC ............... F02M 37/106; F02M 37/103; F02M 2037/225; B60K 2015/03453; B60K 2015/03111; B60K 2015/03467; B60K 2015/03105; Y10T 137/794; Y10T 137/0402; Y10T 137/86228; Y10T 137/86043
USPC ................. 137/565.17, 565.34, 565.37, 509, 549,137/571, 572, 576
See application file for complete search history.

(56) References Cited

U.S. PATENT DOCUMENTS

| | | |
|---|---|---|
| 4,989,572 A | 2/1991 | Giacomazzi et al. |
| 5,762,047 A | 6/1998 | Yoshioka et al. |
| 6,062,203 A | 5/2000 | Takahashi et al. |
| 6,152,174 A | 11/2000 | Hein |
| 6,192,869 B1 | 2/2001 | Hahner et al. |

(Continued)

*Primary Examiner* — Atif Chaudry
(74) *Attorney, Agent, or Firm* — Erickson Kernell IP, LLC

(57) ABSTRACT

A baffle for use in a fuel tank has a sidewall and an interior space. The sidewall is formed of a flexible material so as to be radially compressible. The compressibility of the sidewall allows the baffle to be inserted through a hole which is smaller in diameter than the uncompressed diameter of the baffle. The baffle is preferably also longitudinally compressible so that it can be mounted in fuel tanks of varying depths.

34 Claims, 9 Drawing Sheets

(56) References Cited

U.S. PATENT DOCUMENTS

| | | |
|---|---|---|
| 6,293,420 B1 | 9/2001 | Richter et al. |
| 6,314,995 B1 | 11/2001 | Meyer |
| 6,568,556 B1 | 5/2003 | Kahler, Jr. et al. |
| 6,928,989 B2 | 8/2005 | Powell |
| 7,261,323 B2 | 8/2007 | Grant |
| 7,285,213 B2 | 10/2007 | Barz |
| 7,383,822 B2 | 6/2008 | Ramamurthy et al. |
| 7,520,270 B2 | 4/2009 | Uhara |
| 7,665,446 B2 | 2/2010 | Eck et al. |
| 8,783,287 B2 * | 7/2014 | Matusek ................ B60K 15/03 123/509 |
| 9,255,556 B2 * | 2/2016 | Matusek ................ B60K 15/03 |
| 2009/0133762 A1 | 5/2009 | Watanabe et al. |
| 2011/0000921 A1 | 1/2011 | Hawks |
| 2011/0139128 A1 | 6/2011 | Zhang et al. |
| 2011/0174274 A1 | 7/2011 | Lim et al. |
| 2011/0315699 A1 | 12/2011 | Nakajima et al. |

* cited by examiner

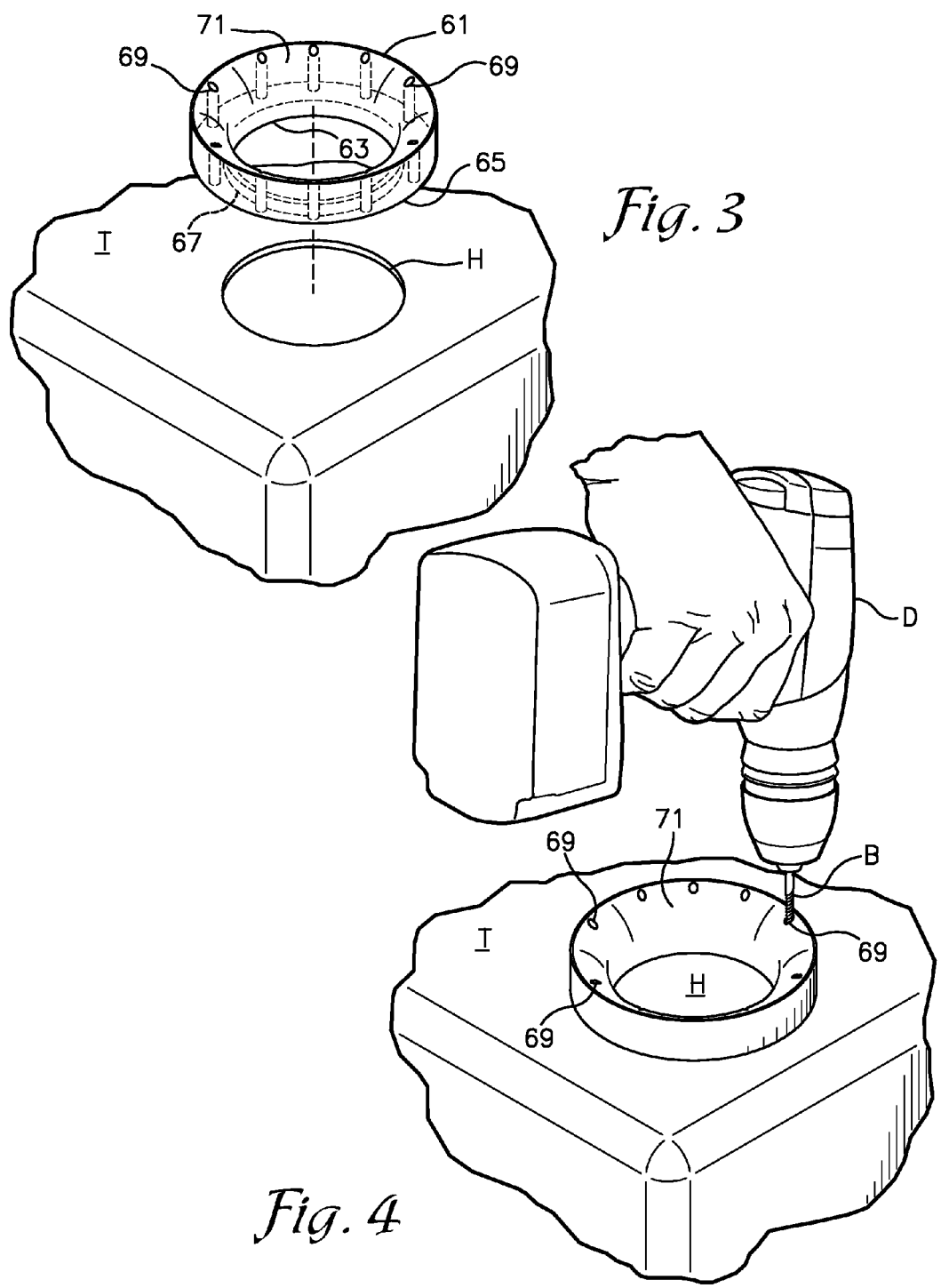

COMPRESSIBLE BAFFLE FOR A FUEL TANK

This application is a continuation-in-part of U.S. patent application Ser. No. 14/302,543 filed Jun. 12, 2014 which was a division of U.S. patent application Ser. No. 13/795,718 filed Mar. 12, 2013, now U.S. Pat. No. 8,783,287, which claimed the benefit of U.S. Provisional Application Ser. No. 61/702,649 filed Sep. 18, 2012.

BACKGROUND OF THE INVENTION

Field of the Invention

This invention relates to automotive fuel systems, and in particular to a compressible baffle for use in a fuel tank; the baffle may be used to install an in-tank fuel pump when the tank was not originally designed for use with such an in-tank pump, when an additional in-tank pump is required, or to add a fuel pickup for an external pump.

Description of the Related Art

Modern automobiles using electronic fuel injection systems utilize a fuel pump mounted inside the fuel tank of the vehicle (hereinafter referred to as an "in-tank pump") to pick up fuel from the tank and deliver it to the engine. Older automobiles, which typically used carburetors to mix fuel with incoming air, did not use in-tank pumps, but instead relied on mechanical or electric pumps mounted outside of the fuel tank.

Recently, it has become increasingly popular among automobile enthusiasts to modify an older car, such as a muscle car from the 1960s or 1970s, by installing a modern fuel injected engine in place of the original power plant, or by replacing the original carburetor with an aftermarket fuel injection system. This type of modification can produce a vehicle with increased performance, improved fuel efficiency and better emissions while retaining the look and feel of the classic muscle car. One problem frequently encountered during the course of making such a modification is the difficulty of mounting an in-tank fuel pump in a fuel tank not originally designed to accept an in-tank pump.

In other applications, it may be advantageous to add an in-tank pump to a fuel system in order to supplement a pre-existing fuel pump. The additional pump may be mounted in parallel to the pre-existing pump and used on-demand to provide additional fuel volume as needed by the engine. The pre-existing fuel pump may be either an external pump or an in-tank pump, such as an original equipment in-tank pump. If the pre-existing fuel pump is an original equipment in-tank pump, it then becomes necessary to modify a fuel tank which was originally designed for use with a single in-tank pump in order for it to accept a second in-tank pump.

In either of the above applications, the problem of mounting an in-tank pump in an existing tank is further complicated by an additional requirement that baffling be added to the tank along with the pump. In-tank fuel pumps need to be surrounded by baffles that prevent all of the fuel from sloshing away from the pump during turns or other abrupt maneuvers. These baffles act to retain a column of fuel over the pump's fuel pickup so that the pump never draws air into the fuel injection system, which can lead to fuel starvation and/or vapor lock. (Carburetors, because they have reserve fuel in their fuel bowls, are more tolerant of momentary fuel deprivation and do not require similar baffles around the fuel pickups.)

In order to add an in-tank pump and baffle to the existing fuel tank, a hole must first be cut into the top of the tank through which the pump and baffle can be inserted. It is advantageous that the hole not be any larger than necessary, and therefore, the baffle should be able to fit through the smallest diameter hole possible (a hole not much larger than the diameter of the pump). The baffle, therefore, should be of thin material, or of a material that can be radially compressed in order to fit though the hole and then allowed to expand once inside the tank. Fuel tanks also vary substantially in depth. In order for the baffle to fit in a wide variety of different tanks, it should be able to be height-adjustable to correspond to the depth of virtually any tank.

What is needed is an apparatus and method for mounting an in-tank pump in a fuel tank, the apparatus including sufficient baffling to retain a column of fuel over the fuel pickup in order to provide an uninterrupted fuel supply to the engine. The apparatus should be adaptable to fit a variety of fuel tanks of differing depths.

SUMMARY OF THE INVENTION

The present invention includes a baffle having an open top, a closed bottom, a sidewall and an interior space sized to receive the in-tank pump. The sidewall is formed of a flexible material so as to be longitudinally compressible. In one embodiment, the sidewall is formed of a fuel permeable foam material at least partially covered by an impermeable skin. The compressibility of the sidewall allows the baffle to be mounted in fuel tanks of varying depths. Also, the sidewall preferably has sufficient resiliency to produce an expansive force when it is compressed, the expansive force helping to retain the baffle in position within the tank. The foam baffle is also radially compressible so that it can fit through a hole which is smaller than its uncompressed outside diameter. The skin allows fuel to flow into the interior space of the baffle from the tank, but provides an impediment to the fuel flowing in the opposite direction during maneuvers which would cause the fuel to slosh in the tank.

The baffle is used in a method for mounting an in-tank fuel pump in a fuel tank. The method includes the steps of cutting a hole in a top wall of the fuel tank, inserting the baffle into the tank through the hole, compressing the sidewall of the baffle so that the baffle extends between the top and bottom walls of the tank, installing the in-tank pump in the interior space of the baffle and installing a cover plate or cap over the hole. The cap may be part of a pump mounting assembly which supports the pump.

BRIEF DESCRIPTION OF THE DRAWINGS

FIG. 3 is a perspective view of an installation tool which can be used in installing the system of FIG. 1 shown in position over a hole in a top wall of a fuel tank;

FIG. 4 is a perspective view of the installation tool of FIG. 3 being used as a drill guide to assist in drilling mounting holes in the top wall of the fuel tank;

DETAILED DESCRIPTION OF THE PREFERRED EMBODIMENTS

Figure 1:
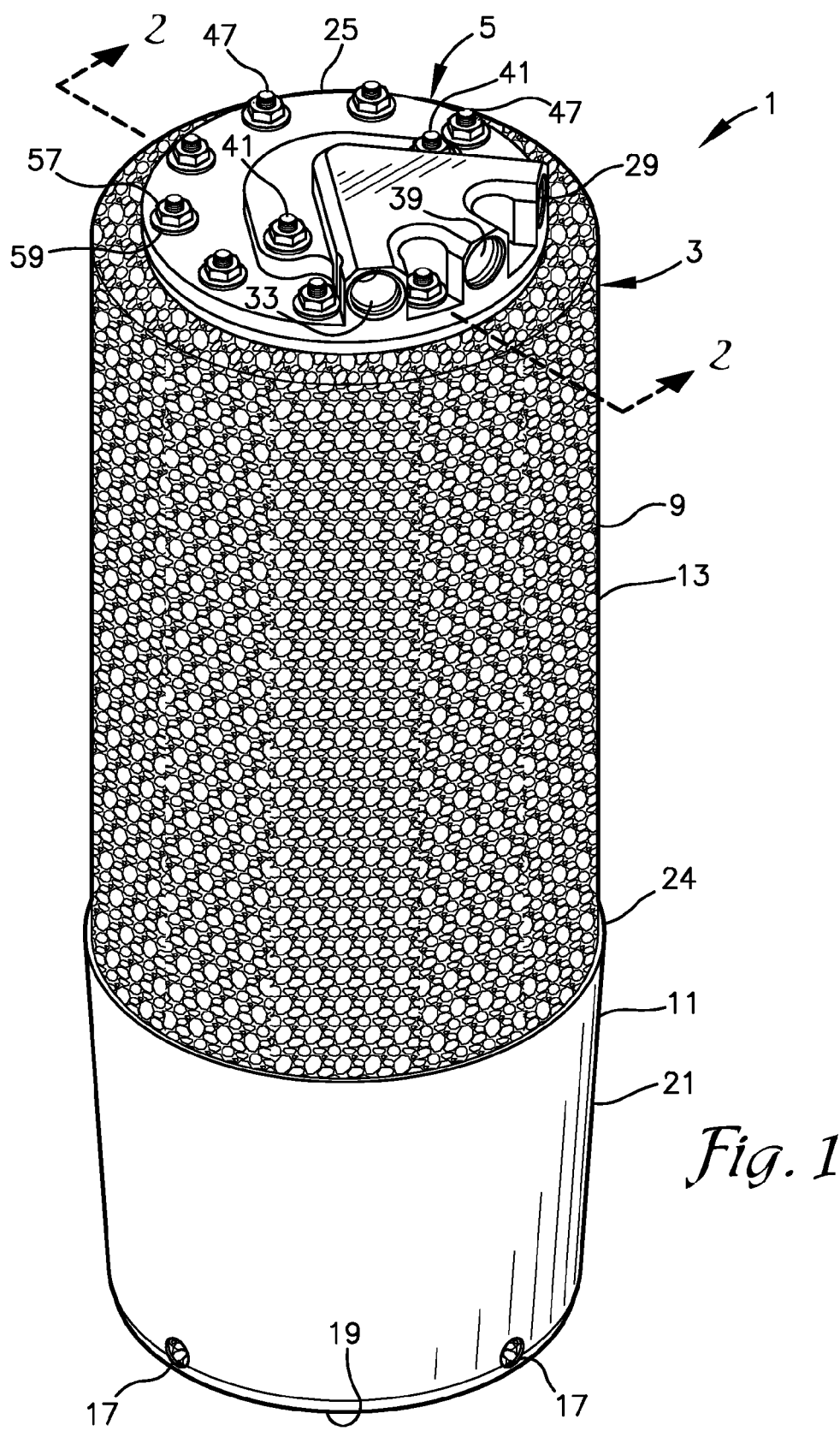
FIG. 1 is a perspective view of a fuel-pump mounting system according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 2:
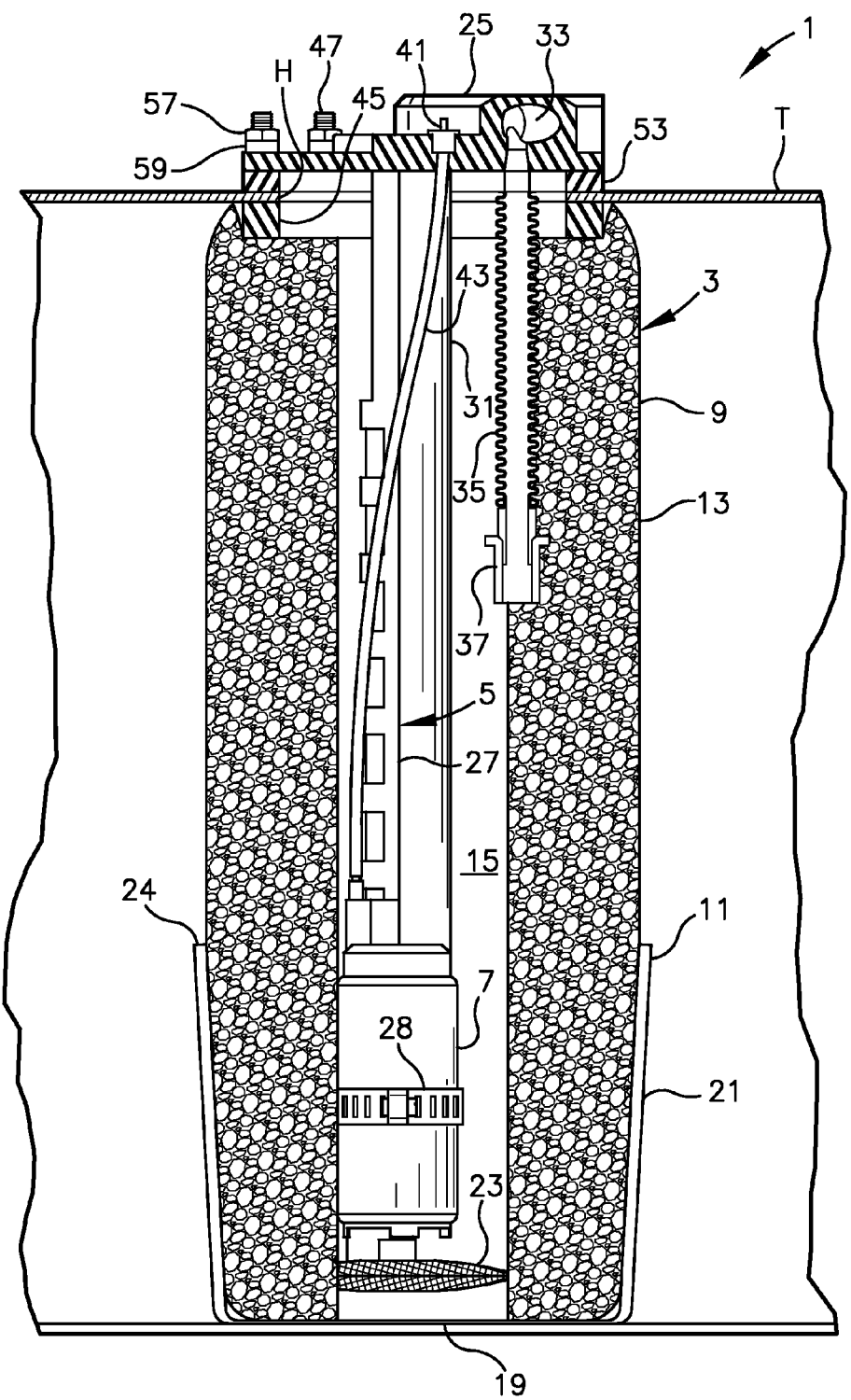
FIG. 2 is a cross-sectional view of the fuel pump mounting system of FIG. 1 installed in a fuel tank and surrounding an in-tank fuel pump.
Figure 5:
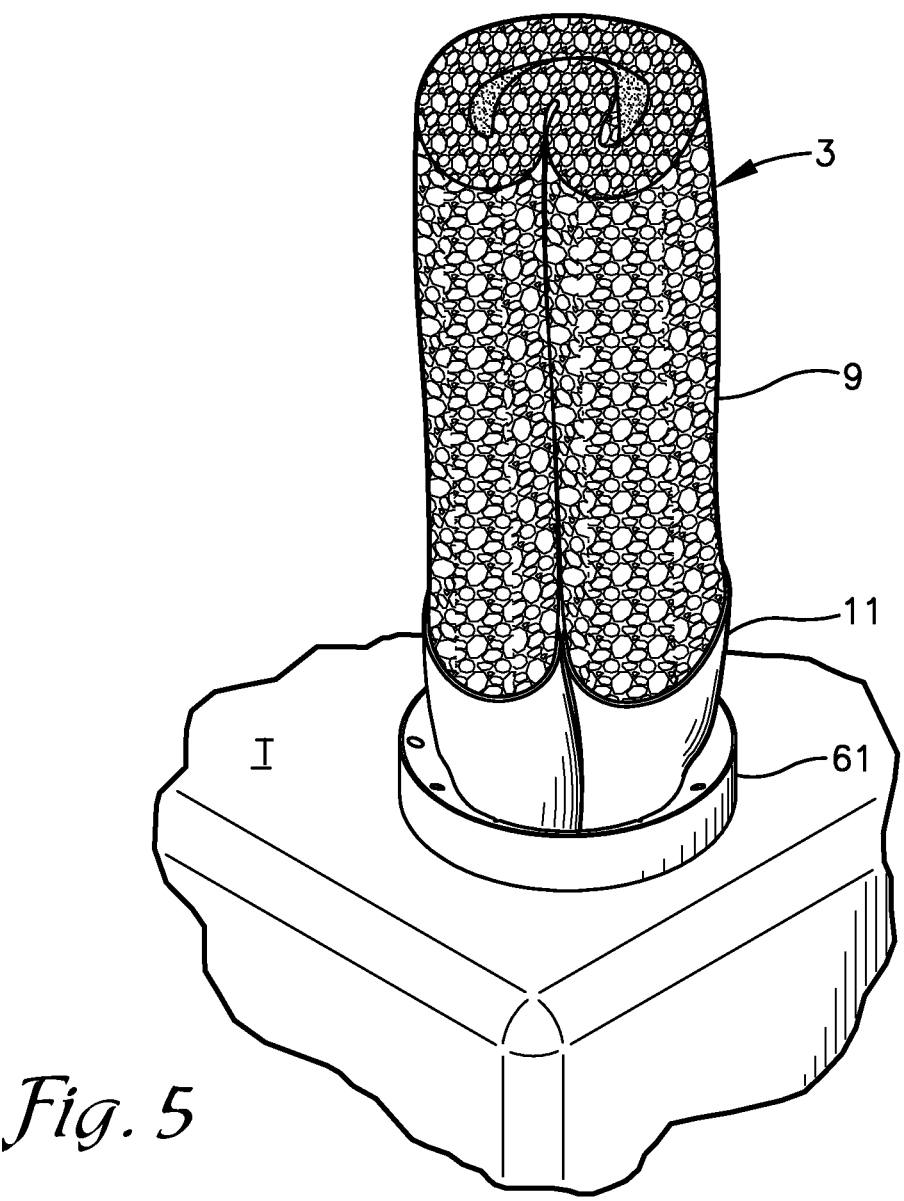
FIG. 5 is a perspective view of the installation tool of FIG. 4 being used as a funnel to assist in inserting a baffle which forms a part of the system of FIG. 1 into the fuel tank.
Figure 6:
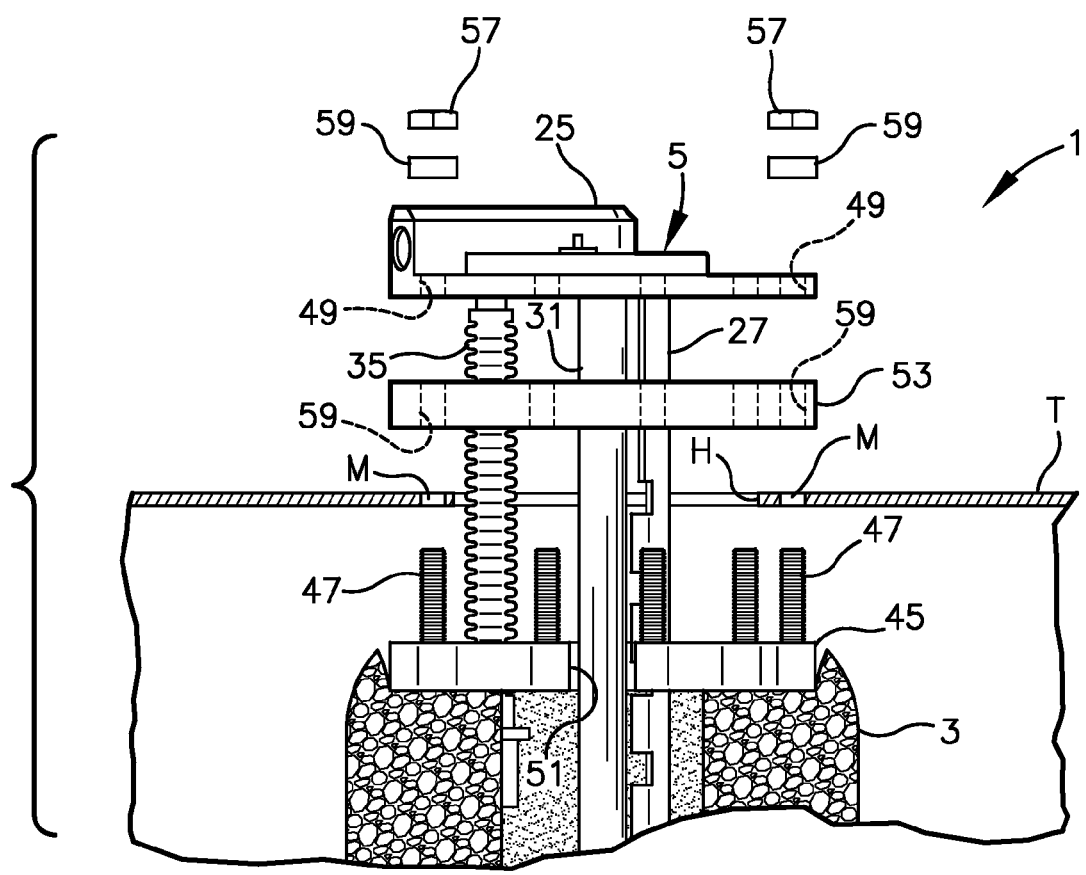
FIG. 6 is a fragmentary exploded cross-sectional view of the system of FIG. 1 being installed in a fuel tank.

Referring to the drawings in more detail, and in particular to FIGS. 1, 2 and 6, the reference number 1 generally designates an apparatus for modifying a fuel tank T according to the present invention. The apparatus 1 includes a baffle 3 and a pump mounting assembly 5 which serves to support an in-tank fuel pump 7 within the baffle 3. The baffle 3 comprises a foam core 9 which has a lower end inserted into an elastomeric cup 11 which forms a skin over a lower portion of the core 9. The core 9 is generally in the shape of a hollow cylinder having a sidewall 13 surrounding an interior space 15 sized to receive the fuel pump 7. The core 9 is porous enough to let fuel pass easily therethrough from the fuel tank T to the interior space 15, whereas the cup 11 is generally impermeable to fuel, except that openings 17 are provided in the cup 11 to allow fuel passage therethrough, as discussed below in further detail.

The core 9 is compressible both longitudinally to match the depth of the tank T and radially to fit through an access hole H in the top wall of the tank T. The core 9 is also preferably resilient enough to re-expand once it is inserted into the tank T and to thereby produces an expansive force which urges the top and bottom ends of the baffle 3 against the top and bottom walls of the tank T, respectively. A preferred material for the core 9 is reticulated polyurethane foam meeting military specification MIL-DTC-83054C for aircraft fuel tank baffle and inerting material. It is to be understood, however that any compressible, and permeable foam material which is acceptably resistant to the respective fuel could be used.

The cup 11 is preferably molded of a fuel resistant elastomer such as nitrile, epichlorohydrin, or the like and is at least somewhat compressible in diameter. It is foreseen, however that the cup 11 could be formed from a sheet material rather than being molded and that other materials, such as mylar, polytetrafluoroethylene, or the like could be used. It is also foreseen that the cup 11 could be formed by applying a sealant (such as AC-236 aerospace sealant, manufactured by 3M), directly to the core 9. The cup 11 includes a closed bottom, bottom wall or floor 19 and a sidewall 21 which has a height selected to only extend part way up the sidewall 13 of the core 9, but high enough to retain a column of fuel over a fuel pickup 23 of the pump 7. Fuel flows over an upper margin 24 of the sidewall 21 of the cup 11, through the core 9 and into the interior space 15 when the fuel level in the tank T is sufficiently high.

The sidewall 21 of the cup 11 includes a plurality of the openings 17 which allow fuel to enter the interior space 15 of the baffle 3 from the tank T, but are sized and positioned to impede fuel from flowing out of the baffle 3 during cornering or other maneuvers that create transient periods during which the fuel in the tank T may flow or slosh away from the baffle 3. For example, small openings 17 may be formed in the sidewall 21 and positioned near the bottom of the baffle 3 to allow fuel to reach the interior space 15 even when the fuel level in the tank T is low, but are small enough that fuel will not flow out of the baffle quickly during periods when fuel sloshes away from the baffle 3, such as during cornering of the vehicle.

The pump mounting assembly 5 includes a cap 25 sized to sealingly cover the access hole H and a pump hanger 27 which extends downwardly from the cap 25. The fuel pump 7 is connected to the hanger 27 proximate a lower end thereof using one or more worm drive clamps 28 or the like. The hanger 27 is shown as having longitudinally spaced notches at different heights for receiving the clamps 28. The cap 25 preferably also includes an outlet port 29 for connection to the fuel injection system, carburetor or carburetors of the vehicle. The outlet port 29 communicates with an in-tank fuel supply line 31, which in turn communicates with an outlet of the fuel pump 7. The cap 25 may also include a return port 33 for returning fuel from fuel injection systems having return lines. The return port 33 communicates with an in-tank return line 35. The return line 35 empties into the baffle 3 in order to add additional fuel to the column of fuel over the fuel pickup 23. The return line 35 may be provided with an end cap 37 which serves as a check valve to prevent fuel from entering the return line 35. Fuel injection systems using pulse width modulation to control the fuel pump 7 do not have return lines, and in these systems the return port 33 is not used. A vent port 39 can also be included in the cap 25.

Electrical connections or terminals 41 may be provided on the cap 25 for connection to a vehicle's electrical system to power the pump 7. The terminals 41 are each connected to the pump 7 by respective lead wires 43.

The cap 25 may be secured to the top wall of the tank T by sheet metal screws or the like (not shown) or by use of an adapter ring 45. The adapter ring 45 generally comprises an annular ring having a planar upper surface and includes a plurality of threaded mounting studs 47 which extend upwardly from the upper surface. Each of the studs 47 is alignable with a respective mounting hole 49 formed in the cap 25. A ring of tank mounting holes M are drilled in the top wall of the tank T around the access hole H, each of the mounting holes M corresponding to a respective one of the studs 47. The adapter ring 45 is interrupted by a gap 51 which allows the adapter ring 45 to be inserted into the tank T through the access hole H, even though the diameter of the adapter ring 45 is greater than the diameter of the access hole H. The adapter ring 45 is positioned with the studs 47 extending upwardly through the mounting holes M in the tank T.

A sealing gasket 53 is installed between the top wall of the tank T and the cap 25 in order to prevent fuel leakage from the tank T and to prevent contaminants from entering the tank T. The gasket 53 is preferably an elastomeric gasket having sufficient thickness to compensate for any ribs or other irregularities which may be formed in the top wall of the tank T. The gasket 53 generally comprises an annular ring having a plurality of holes 55 formed therein and positioned to receive the studs 47 of the adapter ring 45. The cap 25 and gasket 53 are secured to the adapter ring 45 and tank T by self-locking nuts 57 received on the studs 47. Plastic washers 59 are used between the nuts 57 and the cap 25. It should be noted that the gasket 53 in combination with the foam baffle core 9 provide good sound insulation to dampen noise emanating from the pump 7.

In use, a location on the tank T is selected and the access hole H is cut into the top of the fuel tank T using a hole saw or the like. The access hole H must be large enough for the fuel pump 7 to be inserted therethrough. The depth of the tank T is measured and the pump hanger 27 is cut to a length which is somewhat shorter than the depth of the tank T. It is also foreseen that the hanger 27 could be made to telescope or otherwise adjust to tanks T of varying depths. The fuel pump 7 is installed on the hanger 27 (for example by using the clamps 28) and the supply line 31 and lead wires 43 are connected. The core 9 of the baffle 3 is also cut to length; in this case to a length somewhat longer than the depth of the tank T so that the baffle 3 is sized to be compressed between the top and bottom of the tank T.

The mounting holes M must also be drilled in the top wall of the tank T in a circle concentric with the access hole H. In order to assist an installer in drilling the mounting holes M, an installation tool 61 may be provided. The tool 61 may be included as part of a kit that would also include the baffle 3, pump mounting assembly 5, adapter ring 45, gasket 53, nuts 57, washers 59 and, optionally, the pump 7. The tool 61 is generally annular in shape having a center hole 63 and a lower surface 65 having a annular projection 67 sized to be received in the access hole H in the top of the tank T. The fit between the projection 67 and the edge of the access hole H is sufficiently close to center the tool 61 relative to the access hole H. The tool 61 further includes a ring of guide holes 69 formed around the center hole 63 which are positioned to correspond to the desired locations for the mounting holes M in the top of the tank T. By placing the tool 61 on top of the tank T with the projection 67 extending into the access hole H, the tool 61 serves as a drill guide for drilling the mounting holes M. The installer may place the bit B of a drill D through each of the guide holes 69 and drill corresponding mounting holes M through the top wall of the tank T in the correct positions for receiving the studs 47 of the adapter ring 45. It is to be understood, however, that the tool 61 is not required for drilling the mounting holes M and that the locations of the mounting holes M could be laid out using a paper template or the like, or marked directly from the cap 25. The tool 61 serves only as an aide for drilling the mounting holes M more easily and more accurately.

Once the mounting holes M are drilled, the baffle 3 can be inserted into the tank T through the access hole H. It is preferable that the baffle 3 not be installed before the mounting holes M are drilled because he baffle 3 could be damaged by the drill and/or contaminated by metal cuttings from the drilling process. In addition to serving as a drill guide, the tool 61 can also be used as a funnel to assist in getting the baffle 3 into the tank T. An upper surface 71 of the tool 61 is shaped so that it slopes or curves downwardly and inwardly from proximate the outer periphery of the tool 61 into the center hole 63. The slope of the upper surface 71 acts as a funnel to help compress the baffle 3 to a size which is somewhat smaller than the access hole H and guides the baffle 3 past the edges of the access hole H.

As was the case with the drill guide function of the tool 61, it is to be understood that the tool 61 is not required for inserting the baffle 3 into the tank T through the access hole H, and that the baffle 3 could be inserted by hand alone. The tool 61 serves only as an aide for inserting the baffle 3 more easily and with less chance of damaging the baffle 3. Because the baffle 3 is radially compressible, it can be (and preferably is) inserted through an access hole H which is smaller in diameter than the outside diameter of the baffle 3 in its uncompressed state. The baffle 3 is also compressed longitudinally to match the depth of the tank T and is held in place between the top and bottom walls of the tank T by the expansive force of the baffle 3.

After the baffle 3 is installed, the adapter ring 45 can be installed with its studs 47 extending through the mounting holes M in the top wall of the tank T. The adapter ring 45 is first positioned with the gap 51 in the adapter ring 45 receiving the top wall of the tank T adjacent to the access hole H and with one portion of the adapter ring 45 thus positioned inside the tank T. The adapter ring 45 can then be rotated to bring the remaining portion of the adapter ring 45 into the tank T. The studs 47 are aligned with the mounting holes M and inserted therethrough. The baffle 3 is compressed downwardly to receive the adapter ring 24 between the top of the baffle 8 and the top wall of the tank T, and the baffle 8 will then temporarily retain the adapter ring 24 in position against the top wall of the tank T.

Next, the gasket 53 is put into place with the holes 55 receiving the studs 47. The pump mounting assembly 5 and the attached pump 7 are then installed with the hanger 27 and pump 7 positioned in the interior space 15 of the baffle 3. The top cap 25 is rotated such that the mounting holes 49 therein are aligned with the studs 47 and lowered into contact with the gasket 53. The washers 59 and nuts 57 are then installed on the studs 47 and finally the nuts 57 are tightened.

Figure 7:
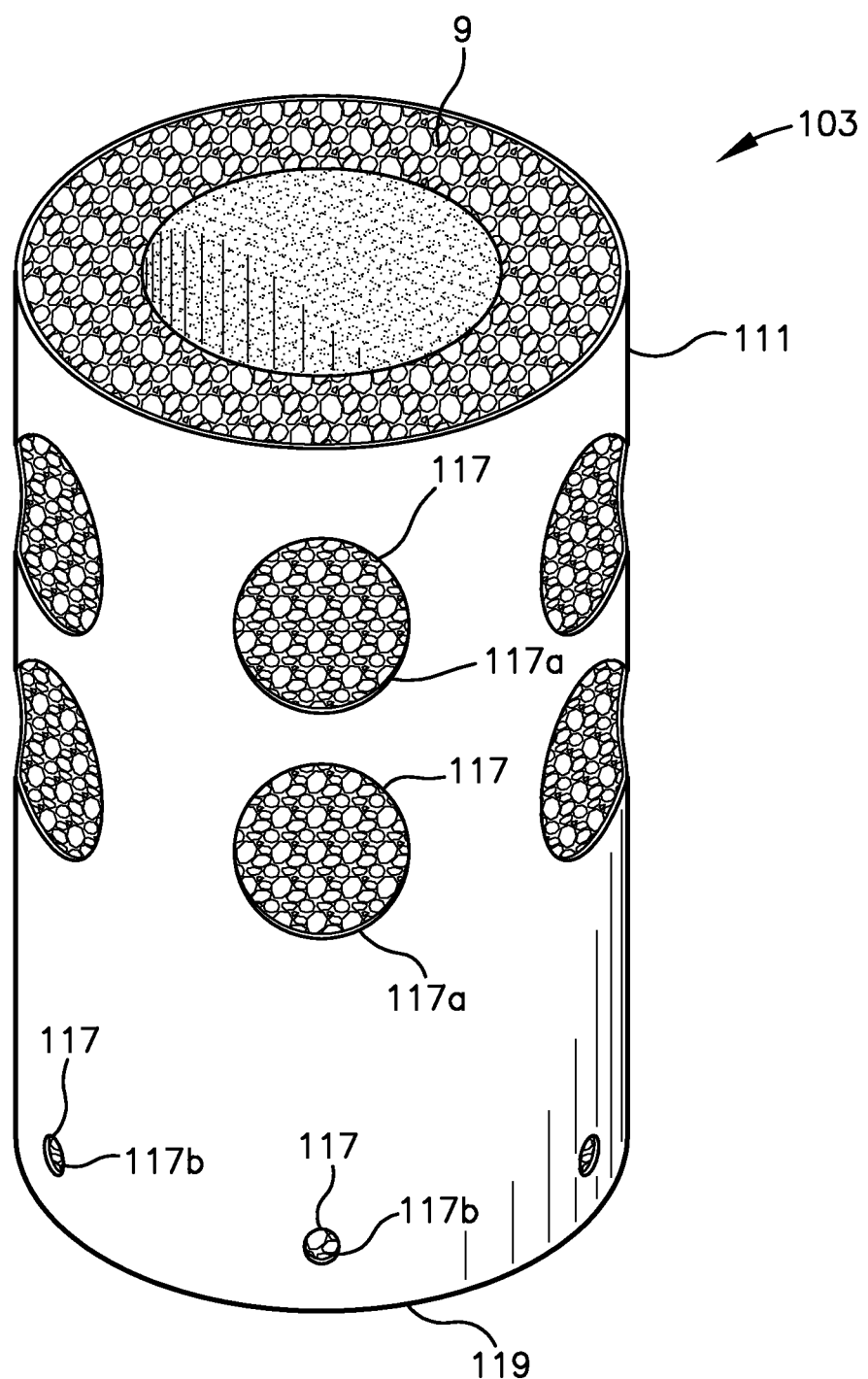
FIG. 7 is a perspective view of a first alternative embodiment of the baffle.

Referring to FIG. 7, a first alternative embodiment of the baffle 3 is designated herein as 103. Like the baffle 3, the baffle 103 includes a foam core 9 as described above. The core 9 of the baffle 103, however, is covered by a skin 111 which extends substantially the entire height of the core 9 and includes a closed bottom or bottom wall 119. The skin 111 is generally impermeable to fuel, except that openings 117 are provided in the skin 111 to allow fuel passage therethrough.

The skin 111 may be formed of mylar, polytetrafluoroethylene, or of a fuel resistant elastomer such as nitrile, epichlorohydrin, or the like. The skin 111 may be formed from sheet material or molded. It is foreseen that the skin 111 could also be formed by applying a sealant (such as AC-236 aerospace sealant, manufactured by 3M), directly to the core 9.

The openings 117 allow fuel to enter the interior space 15 of the core 9 from the tank T, but are sized and positioned to impede fuel from flowing out of the baffle 103 during cornering or other maneuvers that create sloshing of fuel in the tank T. For example, a plurality of larger openings 117a are formed in the skin 111 and positioned on the upper portion of the baffle 103 to allow fuel to flow freely into the baffle 103 when the fuel level is sufficiently high to reach them. Smaller openings 117b are formed in the skin 111 and positioned near the bottom of the baffle 103 to allow fuel to reach the interior space 15 even when the fuel level in the tank T is low, but are small enough that fuel will not flow out of the baffle quickly during periods when fuel sloshes away from the baffle 103. The baffle 103 is used substantially in the same way as the baffle 3 and may be installed according to the same method described above.

Figure 8:
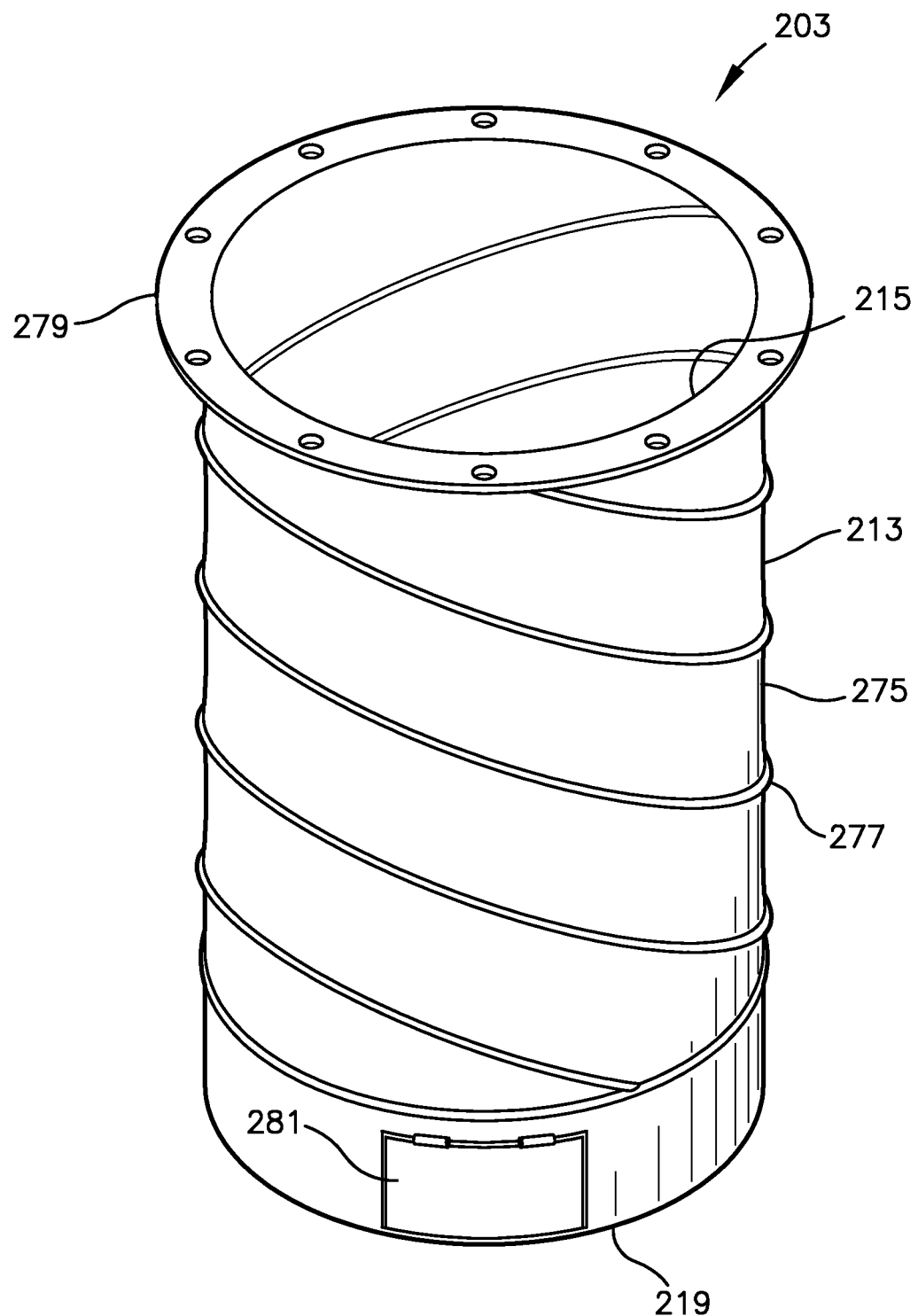
FIG. 8 is a perspective view of a second alternative embodiment of the baffle.

Referring to FIG. 8, a second alternative embodiment of the baffle 3 is designated herein as baffle 203. Like the baffles 3 and 103, the baffle 203 is generally in the shape of a hollow cylinder having a sidewall 213 surrounding an interior space 215 sized to receive the fuel pump 7 and a closed bottom or bottom wall 219. In this embodiment, the baffle 203 is comprised of a flexible membrane 275 attached to a compression spring or similar wire support 277. The upper end of the baffle 203 includes an outwardly extending radial flange 279 for engaging the top wall of the tank T around the access hole H. Proximate the bottom end of the baffle 203, a plurality of doors 281 are formed in the sidewall of the baffle and swing inwardly to admit fuel into the interior space 215 of the baffle 203 from the tank T but do not swing outwardly to allow fuel to flow in the reverse direction.

The baffle 203 is used in generally the same manner as the baffles 3 and 103, however the method of installing the baffle 203 is different from the method previously described in some ways. The baffle 203 is not significantly radially compressible, therefore the access hole H cut into the top of a fuel tank T must be large enough for the baffle 203 to be inserted therethrough. The baffle 203, however, is resilient and even more longitudinally compressible than the baffles 3 and 103 so it would not need to be cut to length before being inserted into the tank T. The baffle 203 is compressed longitudinally to match the depth of the tank T and the top flange 279 is secured to the top wall of the tank T (along with the cap 25 and gasket 53) using sheet metal screws or the like (not shown). The expansive force of the baffle 203, created by the spring 277, urges the bottom end of the baffle 203 against the bottom wall of the tank T.

Figure 9:
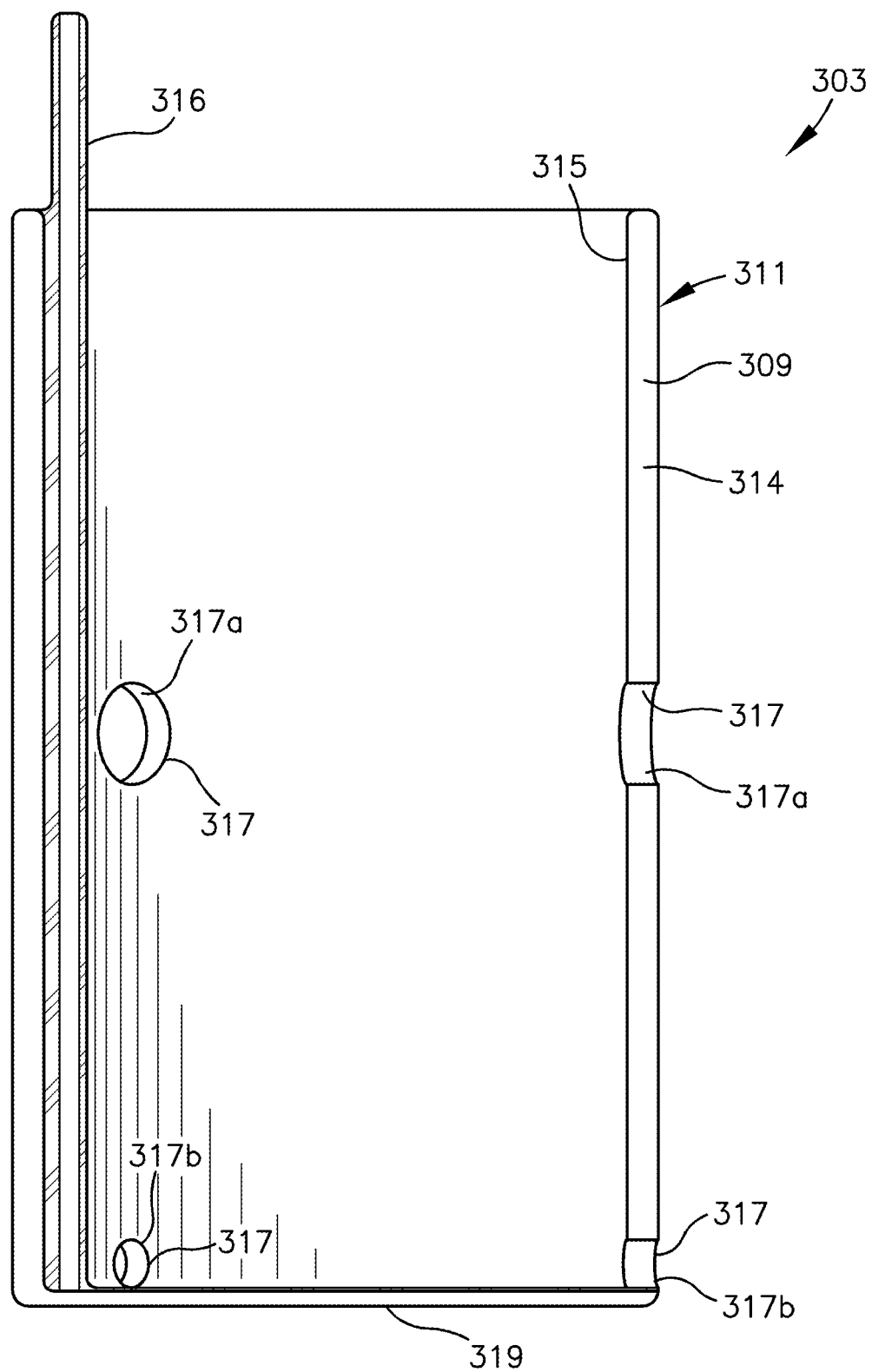
FIG. 9 is a cross-sectional view of a third alternative embodiment of the baffle.

Referring to FIG. 9, a third alternative embodiment of the baffle 3 is designated herein as baffle 303. The baffle 303 is formed of a fillable bladder 311 and a filling material 309. The bladder 311 defines a cavity 314 which receives the filling material 309 and is collapsible for insertion into the tank T when unfilled. When filled, the bladder 311 expands to form a generally cylindrical baffle 303 extending between the top and bottom walls of the tank T and having an interior space 315 which is useable in the same manner as the baffles 3, 103 and 203. Like the skin 111 described above, the bladder 311 may be formed of a fluorocarbon such as polytetrafluoroethylene or another fuel resistant elastomer, such as a nitrile, epichlorohydrin, or the like. The bladder 311 may be formed from sheet material or molded. The filling material 309 is a fluid which fills the cavity 314 to hold the shape of the bladder 311 and may be, for example, a gas such as air, an expandable foam, or a gel. The filling material 309 may be pressurized to provide a biasing force which urges a top end of the baffle 303 against the top wall of the tank T and a bottom end of the baffle 303 against the bottom wall of the tank T, or, in the case of expandable foam and the like, the filling material 309 may have inherent expansive property which provides the biasing force. A filling tube 316 in fluid communication with the cavity 314 is provided for admitting the filling material 309 into the cavity 314. The filling tube 317 may extend through the top wall of the tank T and may include sealing means, such as a check valve (not shown) to prevent the filling material 309 from escaping. The baffle 303 includes a closed bottom or bottom wall 319.

The bladder 311 is generally impermeable to fuel, except that openings 317 are provided in the bladder 311 to allow fuel passage therethrough. The edges of the openings 317 are sealed to prevent escape of the filling material 309. The openings 317 allow fuel to enter the interior space 315 of the baffle 303 from the tank T, but are sized and positioned to impede fuel from flowing out of the baffle 303 during cornering or other maneuvers that create sloshing of fuel in the tank T. For example, a plurality of larger openings 317a are formed in the bladder 311 and positioned on the upper portion of the baffle 303 to allow fuel to flow freely into the baffle 303 when the fuel level is sufficiently high to reach them. Smaller openings 317b are formed in the bladder 311 and positioned near the bottom of the baffle 303 to allow fuel to reach the interior space 315 even when the fuel level in the tank T is low, but are small enough that fuel will not flow out of the baffle quickly during periods when fuel sloshes away from the baffle 303.

In some applications, the baffle 3, 103, 203 or 303 can be used without the mounting of a pump 7 therein. In particular, these may be applications wherein the baffle 3, 103, 203 or 303 surrounds a fuel pickup 423 for an externally mounted pump (not shown). In these applications, there need not be a large hole H formed in the tank T directly above the baffle because no pump need be inserted into the interior space of the baffle. Instead, the baffle 3, 103, 203 or 303 can be inserted into the tank T through an existing opening, such as an opening for an OEM pump or fuel sender unit and then moved laterally to a desired mounting position (as discussed in more detail hereafter). Alternatively, a new hole H might be formed in the tank T in a location remote from the baffle or a single new hole H may be used to insert multiple baffles 3, 103, 203 or 303 for multiple fuel pickups 423. In those applications where the baffle is not positioned directly below the hole H, a smaller hole H' may be formed in the tank T to admit a pickup tube 431 associated with the respective fuel pickup 423. A bulkhead fitting 432 may be used to seal the hole H' around the pickup tube 431 and to retain the pickup tube 431 and fuel pickup 423 in position. In applications where a large hole H is positioned directly above a baffle 3, 103, 203 or 303 used in conjunction with a pickup tube 431, the pickup tube 431 may be attached to a cap 25 used to seal the hole H, either using a bulkhead fitting 432 or using a cap 25 with one or more integral fuel ports similar to the cap 25 shown in FIGS. 2 and 6.

Figure 10:
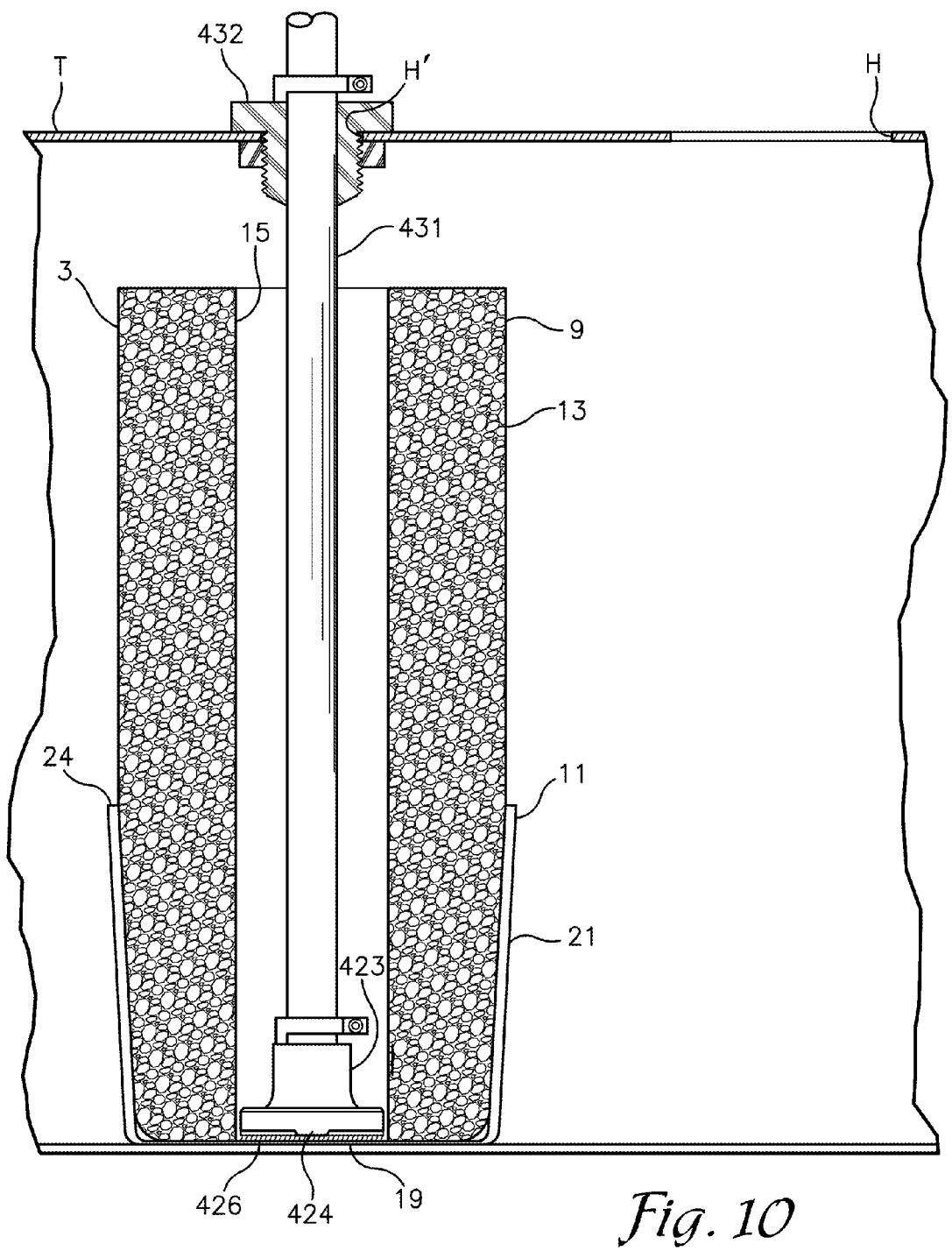
FIG. 10 is a view showing the baffle used in combination with a fuel pickup for an external pump.

For example, FIG. 10 shows a baffle 3 which has been inserted into a tank T through a hole H and subsequently moved into a position which is offset from the hole H. The hole H may be later closed using a cap (not shown), and may or may not be used to mount a second fuel pickup 423. If the hole H is the mounting hole for the original fuel sending unit, then the sending unit can be reinstalled therein. A hole H' is formed in the desired mounting location and the pickup tube 431 is inserted through the hole H' and into the interior space 15 of the baffle 3. The fuel pickup 423 is attached to the lower end of the pickup tube 431 and extends radially outwardly therefrom. The fuel pickup 423 may include a plurality of feet 424 which support the fuel pickup 423 on the bottom wall of the tank T and capture the bottom wall 19 of the cup 11 between the fuel pickup 423 and the bottom wall of the Tank T. In order to protect the bottom wall 19 of the cup 11, a metal plate 426 may be inserted between the bottom wall 19 and the fuel pickup 423. The bulkhead fitting 432 is then installed to retain the pickup tube 431 in position and to seal the hole H' around the pickup tube 431.

Because the pickup tube 431 is fixed in position by the bulkhead fitting 432 and the bottom wall 19 of the cup 11 is captured by the fuel pickup 223 and plate 226, the baffle 3 is also fixed in position. A consequence of the baffle 3 being fixed in position in this manner is that, in this application, the baffle 3 does not need to be compressed between the top and bottom walls of the tank T in order to retain it in position. As such, the baffle 3 is shown as having a shorter sidewall 13 which does not extend upwardly to contact the top wall of the tank T. The foam core 9 acts to support the sidewall 21 of the cup 11 and prevents it from collapsing inwardly.

It is to be understood that while certain forms of the present invention have been illustrated and described herein, it is not to be limited to the specific forms or arrangement of parts described and shown. For example, while the present invention has been described as an apparatus for mounting a fuel pump in an automotive fuel tank, it is foreseen that the same invention could be used in other applications involving other liquids. It is also foreseen that the impermeable membrane, skin or cup which controls flow through the permeable foam material in certain embodiments of the invention could be positioned on the inside of the sidewall rather than on the outside as shown and described herein.

As used in the claims, identification of an element with an indefinite article "a" or "an" or the phrase "at least one" is intended to cover any device assembly including one or more of the elements at issue. Similarly, references to first and second elements, or to a pair of elements, is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. A baffle for mounting in a fuel tank having a top wall and a bottom wall with an access hole formed through said top wall, said baffle comprising:
    a) a sidewall having an initial sidewall diameter larger than the access hole in the top wall of the tank;
    b) an interior space within said sidewall; and
    c) a floor closing a lower end of said sidewall and having an initial floor diameter larger than the access hole in the top wall of the tank; wherein
    d) said floor and said sidewall are both formed from flexible materials so as to be radially compressible from their said initial diameters to respective compressed diameters smaller than the access hole such that said baffle is insertable into the tank through the access hole in the top wall of the tank.

2. The baffle as in claim 1 in combination with an in-tank fuel pump positioned in said interior space.

3. The baffle as in claim 1 in combination with a fuel pickup for an externally mounted pump positioned in said interior space.

4. The baffle as in claim 1 wherein said sidewall includes a core of compressible foam.

5. The baffle as in claim 4 wherein said compressible foam provides an expansive force which urges said sidewall back toward its initial diameter upon insertion into the tank.

6. The baffle as in claim 5 and further including a skin impermeable to the liquid and covering at least part of said sidewall.

7. The baffle as in claim 6 wherein said skin covers a lower part of said sidewall and has an upper margin such that liquid in the tank can flow over said skin and through said foam material of said sidewall to said interior space when a liquid level in the tank is higher than said upper margin of said skin.

8. The baffle as in claim 7 wherein said skin and said floor of said baffle are integrally molded to form a cup covering a lower portion of said core.

9. The baffle as in claim 7 wherein at least one opening is formed in said skin below said upper margin such that liquid in the tank can flow through said at least one opening when a liquid level in the tank is lower than said upper margin of said skin.

10. The baffle as in claim 9 wherein the size of said at least one opening is sized to impede liquid from flowing from said interior space of said baffle out to the tank during transient periods when the liquid sloshes away from said baffle.

11. The baffle as in claim 6 wherein said skin includes:
    a) at least one first opening sized and positioned to allow liquid in the tank to flow freely through said at least one first opening to said interior space of said baffle when a liquid level in the tank is above a selected level; and
    b) at least one second opening sized and positioned to allow liquid in the tank to flow through said at least one second opening to said interior space when a liquid level in the tank is below said selected level and further sized to impede liquid from flowing from said interior space out to the tank during transient periods when the liquid sloshes away from said baffle.

12. The baffle as in claim 4 wherein said compressible foam is permeable to a liquid in the tank.

13. The baffle as in claim 4 wherein said sidewall is longitudinally compressible from a first length in a relaxed state to a shorter, second length, said first length selected such that said sidewall is at least partially compressed when fitted in the tank and extending between the top wall and the bottom wall of the tank; and wherein expansive force of said foam material biases said sidewall toward its first length when said sidewall is at least partially compressed.

14. The baffle as in claim 1 wherein said sidewall is longitudinally compressible from a first length in a relaxed state to a shorter, second length, said first length selected such that said sidewall is at least partially compressed when fitted in the tank and extending between the top wall and the bottom wall of the tank; and
    wherein said baffle further includes biasing means for biasing said sidewall toward its first length when said sidewall is at least partially compressed.

15. The baffle as in claim 14 wherein said biasing means is a spring.

16. The baffle as in claim 14 wherein said flexible material includes a core of compressible foam and said biasing means is provided by an expansive force of said compressible foam.

17. A baffle for mounting in a fuel tank having a top wall and a bottom wall with an access hole formed through said top wall, said baffle comprising:
    a) a sidewall having a core of flexible foam material, said sidewall having an initial diameter in a relaxed state larger than the access hole in the top wall of the tank; and
    b) an interior space within said sidewall; wherein
    c) said sidewall is radially compressible from said initial diameter to a compressed diameter smaller than the access hole such that said baffle is insertable into the tank through the access hole, an expansive force of said foam material urging said sidewall back toward its initial diameter upon insertion into the tank.

18. The baffle as in claim 17 in combination with an in-tank fuel pump positioned in said interior space.

19. The baffle as in claim 17 in combination with a fuel pickup for an externally mounted pump positioned in said interior space.

20. The baffle as in claim 17 wherein said foam material is permeable to a liquid and said baffle further includes a skin impermeable to the liquid covering at least part of said sidewall.

21. The baffle as in claim 20 wherein said skin covers a lower part of said sidewall and has an upper margin such that liquid in the tank can flow over said skin and through said foam material of said sidewall to said interior space when a liquid level in the tank is higher than said upper margin of said skin.

22. The baffle as in claim 21 and further including a floor closing a lower end of said baffle.

23. The baffle as in claim 22 wherein said floor is formed of a flexible material so as to also be radially compressible from an initial diameter greater than the diameter of the access hole to a compressed diameter smaller than the diameter of the access hole.

24. The baffle as in claim 23 wherein said skin and said floor of said baffle are integrally molded to form a cup covering a lower portion of said core.

25. The baffle as in claim 17 wherein said sidewall is longitudinally compressible from a first length in a relaxed state to a shorter, second length, said first length selected such that said sidewall is at least partially compressed when fitted in the tank and extending between the top wall and the bottom wall of the tank; and wherein expansive force of said foam material urges said sidewall toward its first length when said sidewall is at least partially compressed.

26. A baffle for mounting in a fuel tank, said baffle having a sidewall, a floor extending generally transverse to said sidewall and an interior space within said sidewall, said sidewall formed of a flexible material longitudinally compressible from a first length in a relaxed state to a shorter, second length; and biasing means for biasing said sidewall toward its first length and wherein said baffle is sufficiently radially compressible along its entire length, including across the floor thereof, to fit through a hole which is smaller in diameter than an outside diameter of said baffle in its radially uncompressed state.

27. The baffle as in claim 26 in combination with a fuel tank wherein the tank has a top wall and a bottom wall and said first length of said sidewall of said baffle is selected such that said sidewall is at least partially compressed when fitted in the tank and extending between the top wall and the bottom wall of the tank.

28. The baffle as in claim 26 in combination with an in-tank fuel pump positioned in said interior space.

29. The baffle as in claim 26 in combination with a fuel pickup for an externally mounted pump positioned in said interior space.

30. The baffle as in claim 26 wherein said biasing means is a spring.

31. The baffle as in claim 26 wherein said flexible material includes a core of compressible foam and said biasing means is provided by an expansive force of said compressible foam.

32. The baffle as in claim 26 wherein said flexible material forming said sidewall comprises a bladder defining a cavity, said cavity receiving a filling material which expands said bladder from a collapsed condition when unfilled to an expanded condition when filled; said filling material comprising said biasing means for biasing said sidewall toward its first length.

33. The baffle as in claim 32 wherein said filling material is selected from the group consisting of a gas, an expandable foam, and a gel.

34. The baffle as in claim 32 wherein said filling material is pressurized.

* * * * *